(12) United States Patent
Seenappa et al.

(10) Patent No.: US 11,197,198 B2
(45) Date of Patent: Dec. 7, 2021

(54) METHOD, SYSTEM, AND COMPUTER PROGRAM FOR AUTOMATED OFFLOADING OF SUBSCRIBERS DURING MOBILITY MANAGEMENT EQUIPMENT FAILURES

(71) Applicants: AT&T Intellectual Property I, L.P., Atlanta, GA (US); AT&T Mobility II LLC, Atlanta, GA (US)

(72) Inventors: Vikram Seenappa, Sammamish, WA (US); Henry Deccio, Bellevue, WA (US); Mohammed Yousuffi, Lawrenceville, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/443,401

(22) Filed: Jun. 17, 2019

(65) Prior Publication Data
US 2020/0396635 A1  Dec. 17, 2020

(51) Int. Cl.
*H04W 28/08* (2009.01)
*H04W 28/02* (2009.01)
(Continued)

(52) U.S. Cl.
CPC ..... *H04W 28/0842* (2020.05); *H04L 41/0668* (2013.01); *H04W 24/02* (2013.01);
(Continued)

(58) Field of Classification Search
CPC ........ H04W 28/0842; H04W 28/0284; H04W 28/0942; H04W 28/0958; H04W 28/0831; H04W 28/0289; H04W 28/0247; H04W 28/08; H04W 28/0846; H04W 36/0005; H04W 36/12; H04W 36/125; H04W 36/22; H04W 36/385; H04W 48/18; H04W 24/02; H04W 24/04; H04W 24/08; G06F 11/203; H04L 67/10; H04L 67/1034; H04L 67/1004; H04L 67/101; H04L 67/1017; H04L 41/06; H04L 41/0654; H04L 41/0668; H04L 47/125; H04L 2012/568; H04L 2012/08171; H04L 2012/0818; H04L 2012/08207; H04L 2012/08279; H04L 69/40
See application file for complete search history.

(56) References Cited

U.S. PATENT DOCUMENTS 8,948,014 B2    2/2015  Velamati et al.
2009/0318161 A1*  12/2009  Lopes ................... H04W 28/08
                                                455/453
(Continued)

FOREIGN PATENT DOCUMENTS

WO    WO-2016160018 A1 * 10/2016 ............. H04W 8/12

*Primary Examiner* — Joshua Kading
(74) *Attorney, Agent, or Firm* — Andrew Gust; Guntin & Gust, PLC

(57) ABSTRACT

Automated offloading of subscribers in a system having a set of mobility management entities (MMEs) during mobility management equipment failures is provided. Each MME (Continued)

maintains performance status and location information about all MMEs. When an MME senses performance degradation the traffic directed to that MME is allocated among the remaining MMEs in the set.

20 Claims, 4 Drawing Sheets

(51) Int. Cl.
    *H04W 48/18*     (2009.01)
    *H04W 24/04*     (2009.01)
    *H04W 24/02*     (2009.01)
    *H04W 24/08*     (2009.01)
    *H04L 12/24*     (2006.01)
    *H04L 29/08*     (2006.01)

(52) U.S. Cl.
    CPC ....... *H04W 24/04* (2013.01); *H04W 28/0247* (2013.01); *H04W 28/0284* (2013.01); *H04W 28/0289* (2013.01); *H04W 28/0831* (2020.05); *H04W 28/0942* (2020.05); *H04W 28/0958* (2020.05); *H04W 48/18* (2013.01); *H04L 67/10* (2013.01); *H04W 24/08* (2013.01)

(56) References Cited

U.S. PATENT DOCUMENTS

| | | | |
|---|---|---|---|
| 2011/0122845 A1* | 5/2011 | Meirosu | H04W 36/0055 370/332 |
| 2012/0023360 A1* | 1/2012 | Chang | H04W 24/04 714/4.11 |
| 2012/0239792 A1* | 9/2012 | Banerjee | H04L 67/1097 709/223 |
| 2013/0100815 A1* | 4/2013 | Kakadia | H04W 40/00 370/237 |
| 2013/0159487 A1* | 6/2013 | Patel | H04L 61/2007 709/223 |
| 2014/0258540 A1* | 9/2014 | Minakuchi | G06F 9/5083 709/226 |
| 2015/0378760 A1* | 12/2015 | Su | G06F 9/45558 718/1 |
| 2016/0057659 A1* | 2/2016 | Hoshihara | H04L 47/11 370/230 |
| 2016/0219476 A1* | 7/2016 | Onishi | H04W 36/0066 |
| 2016/0269925 A1* | 9/2016 | Chou | H04W 28/16 |
| 2016/0269942 A1* | 9/2016 | Olsson | H04W 36/14 |
| 2017/0150399 A1* | 5/2017 | Kedalagudde | H04L 43/16 |

\* cited by examiner

METHOD, SYSTEM, AND COMPUTER PROGRAM FOR AUTOMATED OFFLOADING OF SUBSCRIBERS DURING MOBILITY MANAGEMENT EQUIPMENT FAILURES

TECHNICAL FIELD

The present disclosure relates to management of communication networks. More particularly, the disclosure relates to a method, system, and computer program for automated offloading of subscribers during mobility management equipment failures.

BACKGROUND

Mobility networks are leveraging network function virtualization (NFV) and software defined network (SDN) and evolving from a vendor-specific architecture to a cloud network architecture Traditional cloud architecture for web services (Amazon Web services (AWS), Azure, Apttus Intelligent Cloud™ (AIC), etc.) use virtual switches or virtual routers or virtual load balancers that handle large numbers of transactions in a web server model with distributed clients. The load balancer virtual machines (VMs) handle traffic from millions of endpoints and use auto scaling or closed loop for failure and recovery scenarios. In traditional cloud infrastructure if a VM crashes or out of service the cloud spins up additional VMs using closed loop logic. Virtual instances of a mobility network, like LTE MME/5G AMF, consist of several different component VMs and form a virtual network function (VNF). Each such VM has different characteristics (example load balancer VM, Back end VM, Database VM etc.). Today the Mobility EPC VNFs do not have the capability (intelligence) to detect partial VNF failures and do not to handle the ingress/inflow of data packets adequately resulting in blackholing of traffic or poor performance of the VNF and end applications. Such results are not desirable from an application perspective.

Mobility Evolved Packet Core (EPC) VNFs are designed to work in a cluster mode which comprises of multiple virtual machine (VM) types. Each VM has specific role, example load balancer VM (LB VM), Call processing VM (CP VM), File Server Board VMs (FS VM), Network Controller Board/Cluster manager etc. In case of cloud outages (hard or transient) that impact backend VMs (e.g. LB VMs, CP VMs, FS VMs, Network Controller Board/Cluster manager), the VNF will continue to accept incoming traffic and may result in higher nodal central processing unit (CPU) utilizations, key performance indicator (KPI) degradation, and congestion scenarios. In a worst case the outage may result in a large/node restart that causes all the attached subscribers to be shed off the network. This may also trigger an attach storm where a significantly large number of user devices attempt to re-attach after a network comes back into service.

Today if a virtual Mobility Management Entity (vMME) or a physical Mobility management entity (pMME) experiences any issues on the underlay/overlay networks or computes/VMs, it results in manual intervention, where the network operator has to manually move the subscribers from the impacted vMME/pMME to other working vMMEs/pMMEs in the MME pool Manually moving subscribes from an LTE MME to different MMEs in the pool is a tedious manual task and takes time, resources and careful planning. Manually moving subscribers during MME outage scenario is a reactive measure.

SUMMARY

One general aspect includes a method including: determining at a network having a first network element and a set of other network elements a performance status of the first network element. The method includes sending status requests from the first network element to the set of other network elements, and receiving, at the first network element, other status information for each network element in the set of other network elements. Status information for each network element in the set of other network elements is maintained at the first network element. Upon sensing a degradation in performance at the first network element network traffic is directed to the set of other network elements.

Implementations may include one or more of the following features. The method where the first network element and each network element in the set of other network elements are virtual mobility management entities. The method where the virtual mobility management entities include one or more virtual machines. The method where the virtual machines include a load balancing virtual machine, a file server board virtual machine or a communications manager virtual machine. The method where the network elements are located at a cloud location.

Another general aspect includes a system including: a memory for storing computer instructions and a processor coupled with the memory, where the processor, responsive to executing the computer instructions, performs certain operations. The operations include determining at a network having a first network element and a set of other network elements a performance status of the first network element. The operations implemented by the system also include sending status requests from the first network element to the set of other network elements and receiving, at the first network element, the status of each network element in the set of other network elements. The operations implemented by the system also include maintaining at the first network element the status information for each network element in the set of other network elements. The operations implemented by the system also include sensing at the first network element a degradation in performance and allocating network traffic directed to the first network element to the set of other network elements.

Another general aspect also includes a non-transitory computer readable medium having computer-executable instructions stored thereon which, when executed by a computer, cause the computer to perform a method. The method includes determining at a network having a first network element and a set of other network elements a performance status of the first network element. The method also includes sending status requests from the first network element to the set of other network elements and receiving, at the first network element, status information for each network element in the set of other network elements. The status information is maintained in the first network element. The method performed by the execution of the instructions in the non-transitory computer readable medium also include sensing at the first network element a degradation in performance, and allocating network traffic directed to the first network element to the set of other network elements.

DETAILED DESCRIPTION OF ILLUSTRATIVE EMBODIMENTS

Figure 1:
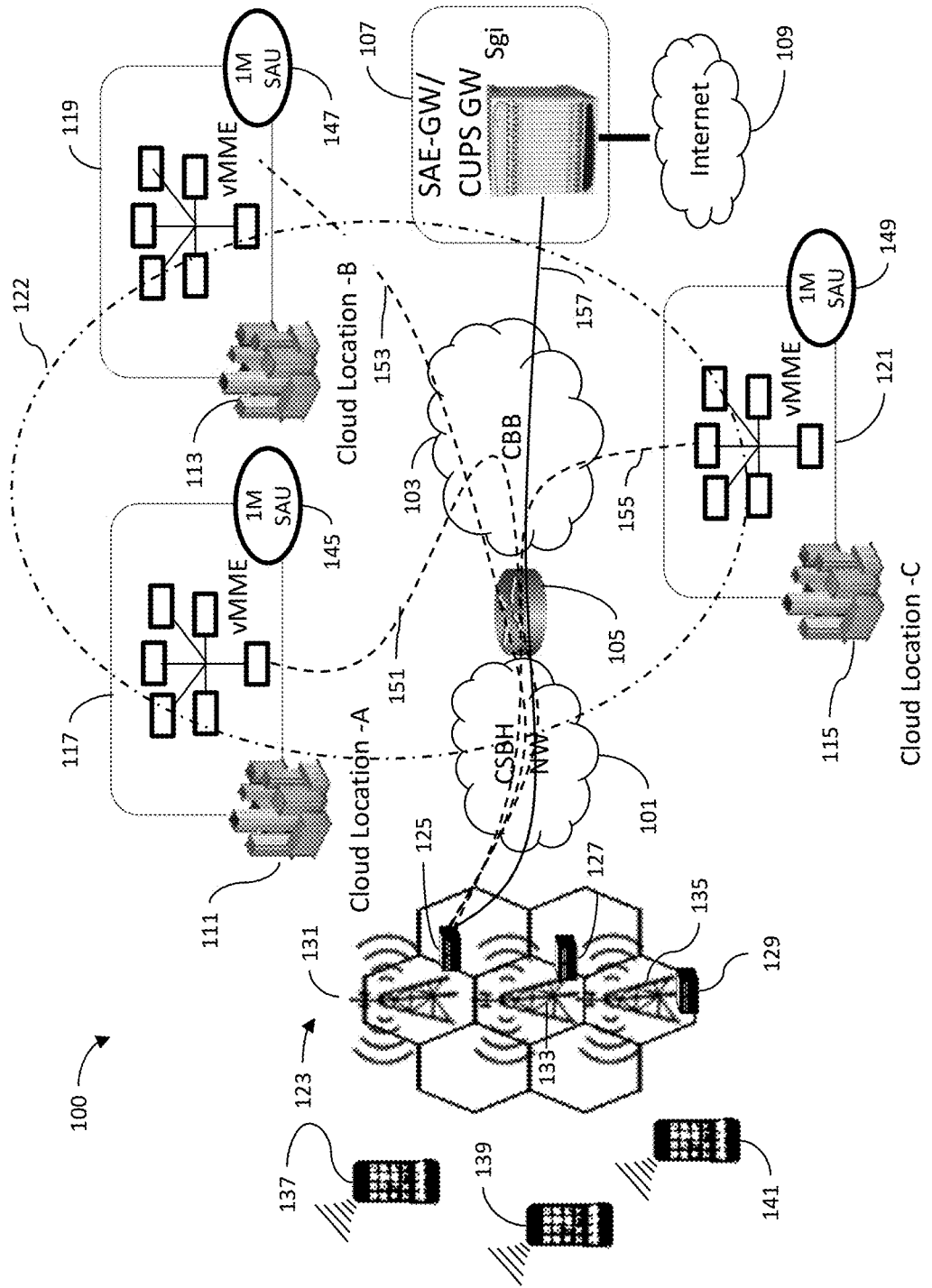
FIG. 1 is a block diagram of a network in which a system for automated offloading of subscribers during mobility management equipment failures may be implemented.

Glossary 5G is a next-generation standard for a network that delivers increased capacity, lower latency, and faster speeds. In addition to greater bandwidth, 5G networks have a dense, distributed network of base stations in the small cell infrastructure. This will allow more processing to happen on the edge, leading to lower latencies.

Access and mobility management function (AMF) receives all connection and session related information from the User Equipment (UE) but is responsible only for handling connection and mobility management tasks. AMF is also responsible for termination of non-access stratum (NAS) signaling, NAS ciphering & integrity protection, registration management, connection management, mobility management, access authentication and authorization, security context management. (AMF has part of the MME functionality in an EPC framework).

Call processing provides the intelligence to determine which end points to connect and to direct the systems of Network to make these connections.

Cell Site Backhaul (CSBH) network is a network that transports data from an end user to a node in a major network such as the Internet or a core (common) backbone (CBB) network.

Cluster managers manage access to workstations, servers, and specialized machines distributed across local-area networks Communications Managers (CMs) provide call processing services for small to very large single-site deployments, multi-site centralized call processing deployments, and/or multi-site distributed call processing deployments. It serves as a foundation to deliver voice, video, TelePresence, IM and presence, messaging, mobility, web conferencing, and security.

Control And User Plane Separation (CUPS). In a 5G networks CUPS decouples Packet Gateway (PGW) control and user plane functions, enabling the data forwarding component (PGW-U) to be decentralized. This allows packet processing and traffic aggregation to be performed closer to the network edge, increasing bandwidth efficiencies while reducing network.

Control Program (CP) acts as a hypervisor layer between the hardware and virtual machines. Each virtual machine appears to have its own CPU, storage (memory), and devices. In reality, these items can be (a) Real—For example, a real network interface may be dedicated to a virtual machine for its exclusive use; (b) Shared—for example, the CPU is shared through time sharing and real storage is shared as virtual storage and what appears as real storage to a guest is actually virtual storage to CP; and (c) Simulated—for example, a virtual switch is a simulated LAN networking switch. CP transparently maps virtual devices and resources to their real counterparts.

Core (Common) Backbone (CBB) Network is a large-scale IP/multiprotocol label switching (MPLS) network that carries all of the core IP traffic with a very high degree of reliability and performance.

Evolved Packet Core (EPC) is a framework for providing converged voice and data on a 4G Long-Term Evolution (LTE) network.

GRPC (gRPC Remote Procedure Calls) is a remote procedure call (RPC) system that uses HTTP/2 for transport, Protocol Buffers as the interface description language. GRPC provides authentication, bidirectional streaming and flow control, blocking or nonblocking bindings, cancellation and timeouts. GRPC is used for connecting microservices style services and to connect user equipment, browser clients to backend services.

Load Balancer is a device that acts as a reverse proxy and distributes network or application traffic across a number of servers. Load balancers are used to increase capacity (concurrent users) and reliability of applications.

Long Term Evolution (LTE) is a standard for wireless broadband communication for mobile devices and data terminals, It increases the capacity and speed using a different radio interface together with core network improvements.

Mobility Management Entity (MME) is a standardized entity in a System Architecture Evolution network dedicated to mobility management. The MME is the key control-node for the LTE access-network. It is responsible for idle mode UE (User Equipment) paging and tagging procedure including retransmissions. It is involved in the bearer activation/deactivation process and is also responsible for choosing the SGW for a UE at the initial attach and at time of intra-LTE handover involving Core Network (CN) node relocation.

Network controller board (NCB) is a networks entity that controls the flow of packets.

Non-Access Stratum (NAS) is a set of protocols in the Evolved Packet System. The NAS is used to convey non-radio signaling between the User Equipment (UE) and the Mobility Management Entity (MME) for an LTE/E-UTRAN access.

Packet Data Network Gateway (PGW) acts as the interface between the LTE network and other packet data networks, such as the Internet.

REST API (Representational State Transfer application programming interface) is a set of rules that developers follow when they create their API. One of these rules states that one should be able to get a piece of data (called a resource) when one links to a specific URL.

SAE Gateway is a is a combination of Packet Data Network (PDN) Gateway (P-GW) and Serving Gateway (S-GW) functions.

Serving Gateway (SGW) is a gateway responsible for routing and forwarding of user data packets. It is also responsible for inter-eNodeB handovers in the user plane and provides mobility between LTE and other types of networks, such as between 2G/3G and P-GW SGi interface connects the PGW to an external packet data network (PDN).

Software Defined Network (SDN) is an architecture that decouples the network control and forwarding function enabling the network control to become directly programmable and the underlying infrastructure to be abstracted for applications and network services.

Virtual file server is a system consisting of one of more virtualized devices that store computer files such as documents, sound files, photographs, movies, images or databases. The server can be accessed by workstations or application servers through the network.

Virtual Machine (VM) is a computer file, typically called an image, that behaves like an actual computer.

Illustrated in FIG. 1 is a network 100 which examples of which may include an LTE network or a 5G network. The network 100 may include a CSBH network 101 and a CBB network 103. CSBH network 101 and CBB network 103 may be connected through a network element (MME/AMF 105). CBB network 103 may be connected with an SGi interface 107 which may include an SAE gateway or a CUPS gateway. The SGi interface 107 connects the CBB 103 to the internet 109. The network 100 may also include a plurality of cloud locations, for example Cloud Location—A 111, Cloud Location—B 113 and Cloud Location—C 150. Associated with each cloud location is a virtual or physical MME, or, in a 5G network, an AMF. For example vMME 117 (or AMF in a 5G network) may be associated with cloud location-A 111. Similarly, vMME 119 may be associated with Cloud Location B-113 and vMME 121 may be associated with Cloud Location—C 115. The MMEs/AMFs (e.g. vMME 117, vMME 119 and vMME 121) comprise an MME/AMF pool 122 (represented by a dashed oval in FIG. 1). The network 100 includes a plurality of base stations or eNodeBs (e.g. eNodeB 125, eNodeB 127 and eNodeB 129). The network 100 also includes a radio access network 123 and includes a plurality of radio towers (e.g. radio tower 131, radio tower 133, and radio tower 135). Radio access network 123 provide services to a plurality of user equipment (e.g. user equipment 137, user equipment 139, and user equipment 141).

The network 100 may service a plurality of simultaneously attached users. For example, 1 million simultaneously attached users (shown as oval 145) may be attached to vMME 117. Similarly, 1 million simultaneously attached users 147 may be attached to vMME 119, and 1 million simultaneously attached users 149 may be attached to vMME 121. Dashed lines 151, 153, and 155 illustrate the control plane flow from eNodeB 125 through CSBH network 101 and CBB Network 103 to vMMe 117, vMMe 119 and vMME 121. Solid Line 157 illustrates the user plane flow from eNodeB 125 through CSBH network 101 and CBB Network 103 to SGi interface 107. In the example illustrated in FIG. 1, traffic is evenly split among Cloud Location—A 111, Cloud Location—B 113 and Cloud Location—C 115. However, it is contemplated that the traffic may be allocated differently.

Each vMME (or AMF) in the MME/AMF pool 122 has an intelligent subscriber offloading mechanism in LTE and 5G networks to other MMEs or AMFs in the MME pool 122.

Figure 2:
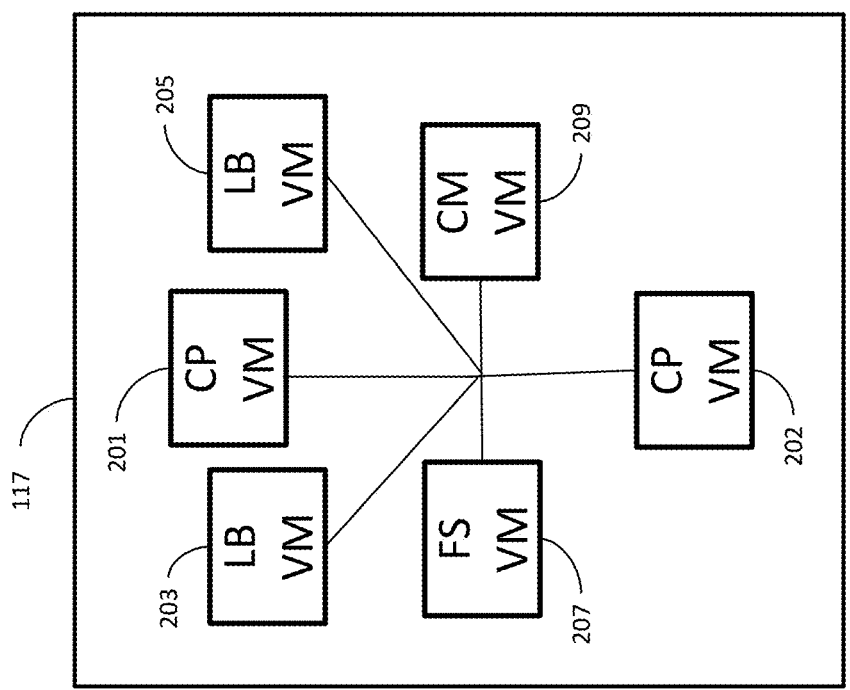
FIG. 2 is a block diagram illustrating the components of virtual MME.

Illustrated in FIG. 2 are some components of a virtual MME such as vMME 117. vMME 117 may include CP (call processing) VMs (e.g. CP VM 201, and CP VM 202), load-balancing VMs (e.g. LB VM 203 and LB VM 205), file server board virtual machines (e.g. FS VM 207) and a CM virtual machine 209.

Figure 3:
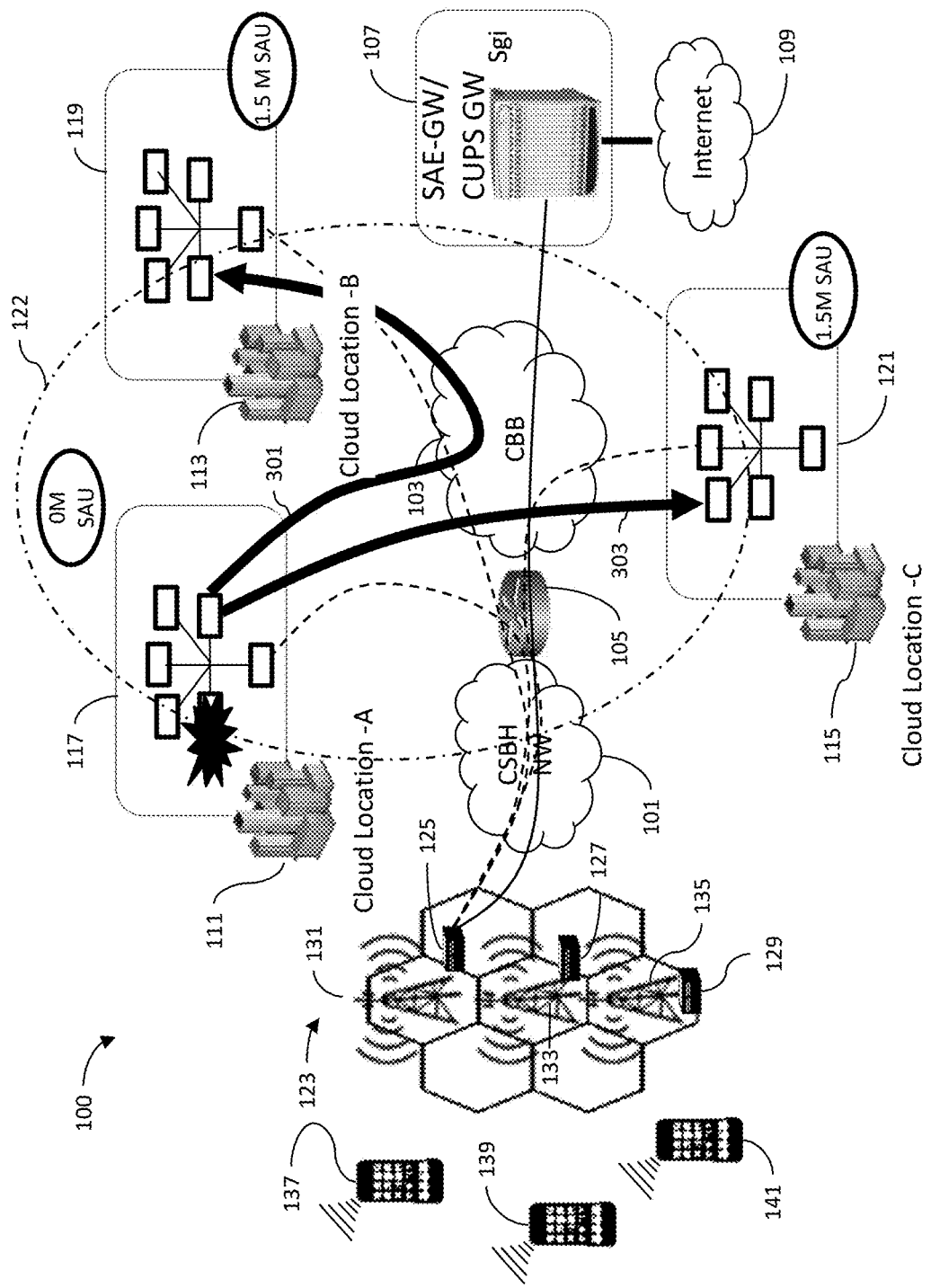
FIG. 3 is a block diagram illustrating the offloading of subscribers during mobility management equipment failures.

FIG. 3 illustrates what happens when there is a failure of the component of vMME 117. vMME 117 maintains the status of the pool health (performance) and determines the performance of all of the MMEs/AMFs in the MME/AMF pool 122. vMME 117 determines which MMEs/AMFs are suitable for subscriber offload through a round robin/load balancing or other mechanism in an event there are partial network or VM outages on the vMME 117. vMME 117 may trigger the movement of traffic in an event there are partial outages on the VNF VMs. Examples of partial outages may include for example, VNF VM reboots, multiple VNF VM failures, errors on the networking layer, inter VM communication errors, software process failures or crashes, 3GPP KPI degradations, Layer 3 KPI degradations etc. Once the LTE/5G subscribers are moved off the vMME 117 and the partial outage issue is cleared, the vMME 117 can communicate its status to other members in the pool 122 and the other vMMEs can offload their subscribers to ensure the MME/AMF pool 122 is balanced with equal subscribers on all vMMEs/AMFs in the MME/AMF pool 122. Each MME/AMF can communicate to other members of the MME/AMF pool 122 through 3GPP Point-to-Point interfaces like S10, N26 or over a Service Based interface like REST API or GRPC. The same logic applies to subscriber pool moves between 5G AMF pool and LTE MME pool or vice versa in case of network outages. As an example, if there is a partial outage on a VNF in vMME 117, vMME 117 would initiate the MME/AMF pool job autonomously to move traffic to vMME 119 and vMME 121 so that the 1 million subscribers assigned to vMME 117 would be transferred to vMME 119 and vMMW 121.

Figure 4:
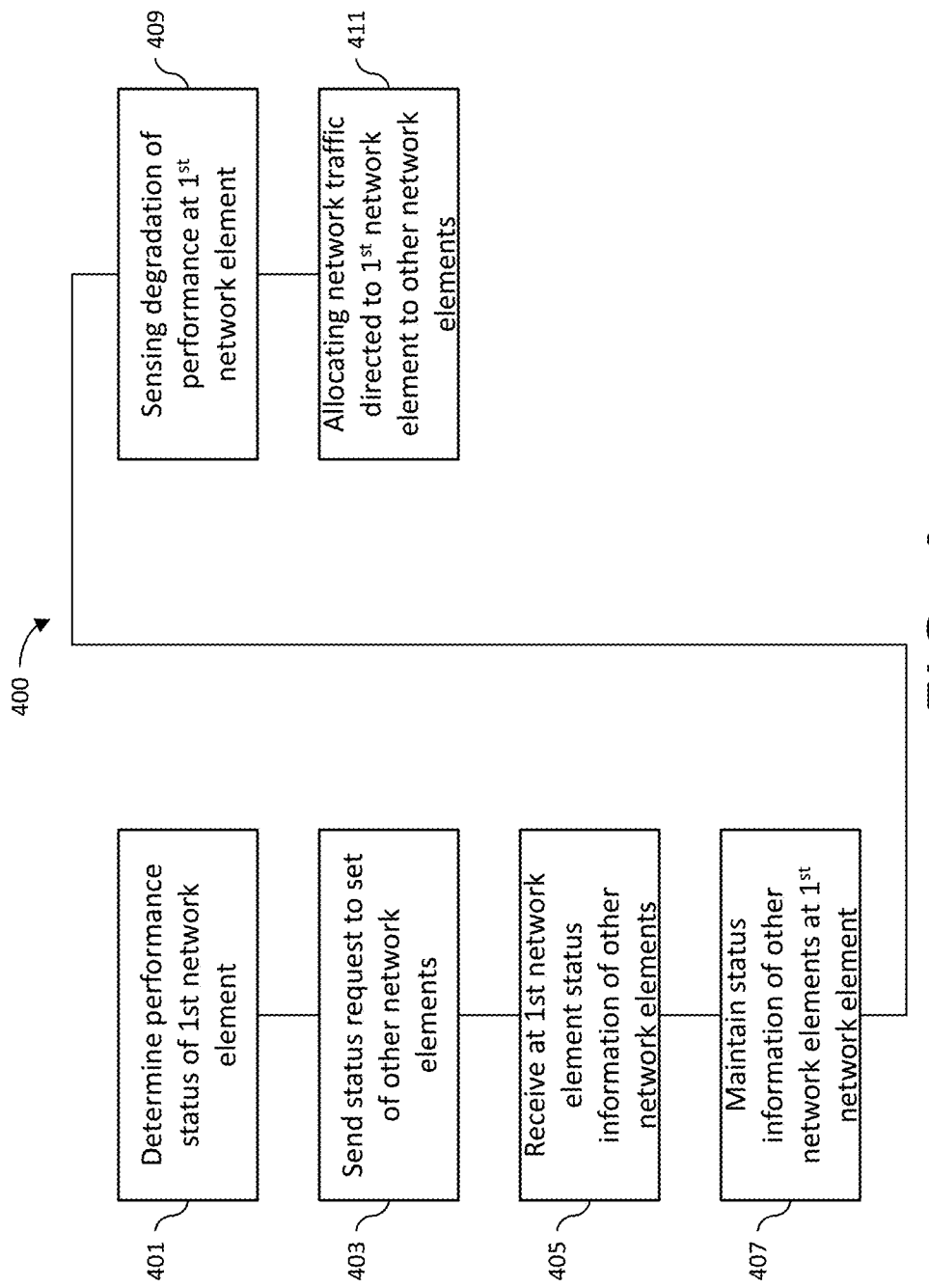
FIG. 4 is a flowchart of a method for automating offloading of subscribers during mobility management equipment failure.

Illustrated in FIG. 4 is a flowchart for a method 400 for automating offloading of subscribers during mobility management equipment failure.

In step 401, the method 400 determines the performance of the first network element. A network element may be a vMME, of a 5G AMF.

In step 403, the method 400 sends status requests to a set of other network elements. The set of other network elements may define a pool of network elements distributed in various clouds. The status requests may relate to request for information related to potential partial outages of VNF VMs, such as VNF VM reboots, multiple VNF VM failures, errors on the networking layer, inter VM communication errors, software process failures or crashes, 3GPP KPI degradations, Layer 3 KPI degradations etc.

In step 405 the first network element receives the status information of the other network elements.

In step 407, the method 400 maintains (stores) status information of other network elements at the first network element thereby providing the status of the health of all potential target network elements.

In step 409, the method 400 senses degradation of performance at the first network element.

In step 411, the method 400 allocates network traffic directed to the first network element to other network elements in the pool.

The method 400 is applicable to 3GPP Application Layer LTE MME and 5G AMF Core network elements, VM or container based VNF. The MME/AMF VNF provides intelligent subscriber offloading mechanism in LTE and 5G networks to other MMEs/AMFs in the pool during partial outage scenario. The previous approaches purely relied on SDN controllers that could re-route the traffic based on layer-3 and Layer-2 traffic and not based on 3GPP Application layer on Wireless Networks.

The source MME/AMF maintains pool health status and knows the health of all the target MMEs and which MMEs are suitable for subscriber offload through a round robin/load balancing or other mechanism in an event there are partial network or VM outages on the source MME/AMF. The source MME/AMF that is impacted will initiate the MME/AMF pool job autonomously to other MME based on set triggers; manual thresholds, KPI triggers, auto thresholds or through Machine Learning Algorithms. Once the LTE/5G subscribers are moved off the impacted MME/AMF, and the impacted MME/AMF issue is cleared; the MME/AMF can communicate its health to other members in the pool and other MME/AMFs can offload their subscribers to ensure the MME/AMF pool is balanced with subscribers on all MME/AMF in the pool The MME/AMF can communicate to other members of the pool through 3GPP Point-to-Point interfaces like S10, N26 or over a Service Based interface like REST API or GRPC. The same logic applies to subscriber pool moves between 5G AMF pool and LTE MME pool or vice versa in case of network outages.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method comprising:
    determining, by a first network element of a first set of network elements of a network, a performance status for each network element of the first set of network elements, wherein each network element of the first set of network elements is a mobility management entity (MME) or access and mobility management function (AMF);
    sending status requests from the first network element to a second set of network elements of the network, wherein each network element of the second set of network elements is a mobility management entity (MME) or access and mobility management function (AMF);
    receiving, at the first network element, status information for each network element in the second set of network elements;
    maintaining, at the first network element, the status information for each network element in the second set of network elements;
    determining, at the first network element, a degradation in performance, wherein the degradation in performance comprises software process failures; and
    autonomously allocating, by the first network element, network traffic directed to the first network element to the second set of network elements based on the determined performance status for each network element of the first set of network elements.

2. The method of claim 1 wherein each MME is a virtual MME.

3. The method of claim 1, wherein the first set of network elements communicate via 3GPP Point-to-Point interfaces or service based interfaces.

4. The method of claim 3, wherein the service based interfaces comprises Representational state transfer application programming interfaces (REST API).

5. The method of claim 1 wherein the first network element and each network element in the second set of network elements comprise virtual network functions.

6. The method of claim 1 wherein the first network element and each network element in the second set of network elements are located at a cloud location.

7. The method of claim 1, wherein the degradation in performance is based on a partial network outage or a partial virtual machine outage on the first network element.

8. A system comprising:
    a memory for storing computer instructions;
    a processor coupled with the memory, wherein the processor, responsive to executing the computer instructions, performs operations comprising:
        determining, by a first network element of a first set of network elements of a network, a performance status for each network element of the first set of network elements, wherein each network element of the first set of network elements is an access and mobility management function (AMF);
        sending status requests from the first network element to a second set of network elements of the network, wherein each network element of the second set of network elements is an access and mobility management function (AMF);
        receiving, at the first network element, status information for each network element in the second set of network elements;
        maintaining at the first network element the status information for each network element in the second set of network elements;
        determining, at the first network element, a degradation in performance, wherein the degradation in performance comprises software process failures; and
        autonomously allocating, by the first network element, network traffic directed to the first network element to the second set of network elements based on the determined performance status for each network element of the first set of network elements.

9. The system of claim 8 wherein each AMF is a virtual AMF.

10. The system of claim 8 wherein the first set of network elements communicate via 3GPP Point-to-Point interfaces or service based interfaces.

11. The system of claim 10 wherein the service based interfaces comprises Representational state transfer application programming interfaces (REST API).

12. The system of claim 8 wherein the first network element and each network element in the second set of network elements comprise virtual network functions.

13. The system of claim 8 wherein the first network element and each network element in the second set of network elements are located at a cloud location.

14. The system of claim 8 wherein network traffic is allocated based on 3GPP application layer policy control.

15. A non-transitory, tangible computer-readable medium having computer-executable instructions stored thereon which, when executed by a computer, cause the computer to perform a method comprising:
- determining, by a first network element of a first set of network elements of a network, a performance status for each network element of the first set of network elements, wherein each network element of the first set of network elements is a mobility management entity (MME) or access and mobility management function (AMF);
- sending status requests from the first network element to a second set of network elements of the network, wherein each network element of the second set of network elements is a mobility management entity (MME) or access and mobility management function (AMF);
- receiving, at the first network element, status information for each network element in the second set of network elements;
- maintaining, at the first network element, the status information for each network element in the second set of network elements;
- determining, at the first network element, a degradation in performance, wherein the degradation in performance comprises software process failures; and
- autonomously allocating, by the first network element, network traffic directed to the first network element to the second set of network elements based on the determined performance status for each network element of the first set of network elements.

16. The non-transitory, tangible computer-readable medium of claim 15 wherein each MME is a virtual MME.

17. The non-transitory, tangible computer-readable medium of claim 16 wherein the first set of network elements communicate via 3GPP Point-to-Point interfaces or service based interfaces.

18. The non-transitory, tangible computer-readable medium of claim 17 wherein the service based interfaces comprises Representational state transfer application programming interfaces (REST API).

19. The non-transitory, tangible computer-readable medium of claim 15 wherein the first network element and each network element in the second set of network elements comprise virtual network functions.

20. The non-transitory, tangible computer-readable medium of claim 15, wherein the first network element and each network element in the second set of network elements are located at a cloud location.

* * * * *